United States Patent
Zhang et al.

(10) Patent No.: US 10,329,189 B2
(45) Date of Patent: Jun. 25, 2019

(54) HIGH MODULUS GLASS FIBRE COMPOSITION, AND GLASS FIBRE AND COMPOSITE MATERIAL THEREOF

(71) Applicant: JUSHI GROUP CO., LTD., Tongxiang (CN)

(72) Inventors: Yuqiang Zhang, Tongxiang (CN); Guorong Cao, Tongxiang (CN); Lin Zhang, Tongxiang (CN); Wenzhong Xing, Tongxiang (CN); Guijiang Gu, Tongxiang (CN)

(73) Assignee: JUSHI GROUP CO., LTD., Tongxiang, Zhejiang (CN)

( * ) Notice: Subject to any disclaimer, the term of this patent is extended or adjusted under 35 U.S.C. 154(b) by 0 days.

(21) Appl. No.: 15/739,110

(22) PCT Filed: Jun. 16, 2016

(86) PCT No.: PCT/CN2016/086022
§ 371 (c)(1),
(2) Date: Dec. 21, 2017

(87) PCT Pub. No.: WO2017/190405
PCT Pub. Date: Nov. 9, 2017

(65) Prior Publication Data
US 2018/0186688 A1    Jul. 5, 2018

(30) Foreign Application Priority Data

Jun. 7, 2016  (CN) .......................... 2016 1 0403705

(51) Int. Cl.
*C03C 3/095* (2006.01)
*C03C 13/00* (2006.01)

(52) U.S. Cl.
CPC .............. *C03C 13/00* (2013.01); *C03C 3/095* (2013.01); *C03C 2213/00* (2013.01)

(58) Field of Classification Search
CPC ....... C03C 13/00; C03C 13/046; C03C 3/087; C03C 3/091; C03C 3/095; C03C 13/06
See application file for complete search history.

(56) References Cited

U.S. PATENT DOCUMENTS

| | | | |
|---|---|---|---|
| 6,627,569 | B1 | 9/2003 | Naumann et al. |
| 7,515,332 | B2 | 4/2009 | Tsuda |
| 7,799,713 | B2 | 9/2010 | Hofmann et al. |
| 2007/0179038 | A1 | 8/2007 | Uehara |
| 2011/0028606 | A1 | 2/2011 | Li et al. |
| 2013/0217807 | A1 | 8/2013 | McGinnis et al. |
| 2015/0018194 | A1 | 1/2015 | Li et al. |
| 2016/0068428 | A1 | 3/2016 | Li et al. |

FOREIGN PATENT DOCUMENTS

| | | | |
|---|---|---|---|
| CN | 1340034 A | 3/2002 | |
| CN | 101734862 A | 6/2010 | |
| CN | 103221354 | 7/2013 | |
| CN | 104743888 A | 7/2015 | |
| CN | 105392744 A | 3/2016 | |
| EP | 1653499 B1 | 5/2011 | |
| RU | 2129102 C1 | 4/1999 | |
| RU | 2607331 C2 | 1/2017 | |
| WO | WO-2014062715 A1 * | 4/2014 | ............ C03C 3/095 |

OTHER PUBLICATIONS

International Search Report for PCT/CN2016/086022, dated Feb. 22, 2017.
Written Opinion of the International Search Authority for PCT/CN2016/086022, dated Feb. 22, 2017.
From EP App. No. 16900927.1, Extended European Search Report, dated Nov. 16, 2018.
From PCT/CN2016/086022, Written Opinion of the International Searching Authority, dated Feb. 22, 2017, with English translation from WIPO.
From PCT/CN2016/086022, International Search Report, dated Feb. 22, 2017, with English translation from WIPO.
From PCT/CN2016/086022, International Preliminary Report on Patentability, dated Dec. 11, 2018, with English translation from WIPO.
From CN App. No. 201610403705.7, First Office Action, dated Nov. 23, 2017, with machine English translation from Global Dossier.

* cited by examiner

*Primary Examiner* — Elizabeth A. Bolden
(74) *Attorney, Agent, or Firm* — Ladas & Parry, LLP

(57) ABSTRACT

A high-modulus glass fiber composition, and a glass fiber and a composite material therefrom. The glass fiber composition comprises the following components in weight percentage: $SiO_2$ 55.7 to 58.9%, $Al_2O_3$ 15 to 19.9%, $Y_2O_3$ 0.1 to 4.3%, $La_2O_3$ less than or equal to 1.5%, $CeO_2$ less than or equal to 1.2%, CaO 6 to 10%, MgO 9.05 to 9.95%, SrO less than or equal to 2%, $Li_2O+Na_2O+K_2O$ less than or equal to 0.99%, $Li_2O$ less than or equal to 0.65%, $Fe_2O_3$ less than 1%, $TiO_2$ 0.1 to 1.5%; wherein, the range of the weight percentage ratio $C1=Y_2O_3/(Y_2O_3+La_2O_3+CeO_2)$ is greater than 0.6. The composition can greatly improve the elastic modulus of glass, significantly reduce liquidus temperature and forming temperature of the glass, greatly reduce the crystallization rate of molten glass and bubble amount under the same conditions, and therefore is more suitable for large-scale tank furnace production of high-modulus fiberglass with low bubble amount.

16 Claims, No Drawings

HIGH MODULUS GLASS FIBRE COMPOSITION, AND GLASS FIBRE AND COMPOSITE MATERIAL THEREOF

CROSS REFERENCE TO RELATED APPLICATIONS

The present application is the U.S. national phase of PCT Application No. PCT/CN2016/086022 filed on Jun. 16, 2016, which claims priority to Chinese Patent Application NO. 201610403705.7 filed on Jun. 7, 2016 and entitled "HIGH MODULUS GLASS FIBRE COMPOSITION, AND GLASS FIBRE AND COMPOSITE MATERIAL THEREOF", the disclosures of which is are incorporated herein by reference in their entireties.

FIELD OF THE INVENTION

The invention relates to high-modulus glass fiber compositions, in particular, to high-modulus glass fiber compositions that can be used as a reinforcing base material for advanced composites, and to the glass fiber and composite material therefrom.

BACKGROUND OF THE INVENTION

Glass fiber is an inorganic fiber material that can be used to reinforce resins to produce composite materials with good performance. As a reinforcing base material for advanced composite materials, high-modulus glass fibers were originally used mainly in the national defense industry, such as aeronautic, aerospace and military industry. With the progress of science and technology and the development of economy, high-modulus glass fibers have been widely used in civil and industrial fields such as wind blades, pressure vessels, offshore oil pipes, and auto industry.

The original high-modulus glass compositions were based on an $MgO$—$Al_2O_3$—$SiO_2$ system, and a typical composition was the S-2 glass developed by OC company of US. Its modulus is 89-90 GPa; however, the production of S-2 glass is excessively difficult, as its forming temperature is up to about 1571° C. and its liquidus temperature is up to 1470° C. and therefore, it is difficult to realize large-scale industrial production. Then OC company gave up the production of S-2 glass fiber and assigned the patent to AGY company of US.

Thereafter, OC company has developed HiPer-tex glass. Its modulus is 87-89 GPa, which was a trade-off for production scale by sacrificing some of the glass properties. However, since these designed solutions just made a simple improvement on the S-2 glass, the forming temperature and liquidus temperature of the glass fiber were still high and the production of glass remained highly difficult, it is also difficult to realize large-scale tank furnace production. Then OC company gave up the production of HiPer-tex glass fiber and assigned the patent of HiPer-tex glass fiber to 3B company of Europe.

Saint-Gobain of France has developed R glass that is based on an $MgO$—$CaO$—$Al_2O_3$—$SiO_2$ system, and its modulus is 86-89 GPa. However, the total content of $SiO_2$ and $Al_2O_3$ remains high in the traditional R glass, and there is no effective solution to improve the crystallization performance, as the ratio of Ca to Mg is inappropriately designed, thus causing difficulty in fiber formation as well as a great risk of crystallization, high surface tension and fining difficulty of molten glass. The forming temperature is up to about 1410° C. and the liquidus temperature is up to 1350° C. All these have caused difficulty in attenuating glass fiber and consequently resulting in realizing large-scale tank furnace production.

Nanjing Fiberglass Research & Design Institute Co. Ltd in China has developed an HS2 glass having a modulus of 84-87 GPa. The HS2 glass mainly comprises $SiO_2$, $Al_2O_3$ and MgO, and certain amounts of $Li_2O$, $B_2O_3$, $CeO_2$ and $Fe_2O_3$ are also introduced; its forming temperature is only about 1245° C. and its liquidus temperature is 1320° C. Both temperatures are much lower than those of S glass fiber. However, since its forming temperature is lower than its liquidus temperature thus resulting in a negative $\Delta T$ value, which is unfavorable for the control of glass fiber attenuation, the forming temperature has to be increased and specially-shaped tips of bushing have to be used to prevent a glass crystallization phenomenon from occurring in the fiber drawing process. This causes difficulty in temperature control and also makes it difficult to realize large-scale tank furnace production.

In summary, we have found that, various kinds of high-modulus glass fibers at this stage generally face production difficulty in large-scale tank furnace production, such as high liquidus temperature, high crystallization rate, high forming temperature, high surface tension and fining difficulty of molten glass, and a narrow temperature range ($\Delta T$) for fiber formation and even a negative $\Delta T$. For this reasons, most companies tend to reduce the production difficulty by sacrificing some of the glass properties. Thus, the modulus of the above-mentioned glass fibers cannot be improved with the growth of production scale, and the modulus bottleneck has long remained unresolved in the production of the S glass fiber.

SUMMARY OF THE INVENTION

The present invention aims to provide a high-modulus glass fiber composition that can solve the aforesaid problems. The composition can not only significantly improve glass modulus, but also solve the production problems of traditional high-modulus glasses, such as high crystallization risk, fining difficulty and the difficulty of realizing efficient large-scale tank furnace production. The composition can significantly reduce the liquidus temperature, crystallization rate of molten glass and the bubble amount under the same conditions, and therefore is more suitable for large-scale tank furnace production of high-modulus fiberglass with a low bubble amount.

According to one aspect of the present invention, a glass fiber composition is provided comprising the following components expressed as weight percentage:

| Component | Weight % |
|---|---|
| $SiO_2$ | 55.7-58.9% |
| $Al_2O_3$ | 15-19.9% |
| $Y_2O_3$ | 0.1-4.3% |
| $La_2O_3$ | less than or equal to 1.5% |
| $CeO_2$ | less than or equal to 1.2% |
| CaO | 6-10% |
| MgO | 9.05-9.95% |
| SrO | less than or equal to 2% |
| $Li_2O + Na_2O + K_2O$ | less than or equal to 0.99% |
| $Li_2O$ | less than or equal to 0.65% |
| $Fe_2O_3$ | less than 1% |
| $TiO_2$ | 0.1-1.5% | wherein, the range of the weight percentage ratio $C1=Y_2O_3/(Y_2O_3+La_2O_3+CeO_2)$ is greater than 0.6.

Wherein, the total content of $La_2O_3$ and $CeO_2$ is further restricted to be 0.1-2% by weight percentage.

Wherein, the range of the weight percentage ratio C2=SiO$_2$/CaO is further restricted to be 5.8-9.3.

Wherein, the range of the weight percentage ratio C3=MgO/(CaO+SrO) is further restricted to be 0.9-1.6.

Wherein, the content of Li$_2$O is further restricted to be 0.05-0.55% by weight percentage.

Wherein, the content of Y$_2$O$_3$ is further restricted to be 0.5-3.9% by weight percentage.

Wherein, the range of the weight percentage ratio C1=Y$_2$O$_3$/(Y$_2$O$_3$+La$_2$O$_3$+CeO$_2$) is further restricted to be 0.75-0.97.

Wherein, the glass fiber composition comprises the following components expressed as weight percentage:

| | |
|---|---|
| SiO$_2$ | 55.7-58.9% |
| Al$_2$O$_3$ | 15-19.9% |
| Y$_2$O$_3$ | 0.1-4.3% |
| La$_2$O$_3$ | less than or equal to 1.5% |
| CeO$_2$ | less than or equal to 1.2% |
| CaO | 6-10% |
| MgO | 9.05-9.95% |
| SrO | less than or equal to 2% |
| Li$_2$O + Na$_2$O + K$_2$O | less than or equal to 0.99% |
| Li$_2$O | less than or equal to 0.65% |
| Fe$_2$O$_3$ | less than 1% |
| TiO$_2$ | 0.1-1.5% | wherein, the range of the weight percentage ratio C1=Y$_2$O$_3$/(Y$_2$O$_3$+La$_2$O$_3$+CeO$_2$) is greater than 0.6, the range of the weight percentage ratio C2=SiO$_2$/CaO is 5.8-9.3, and the range of the weight percentage ratio C3=MgO/(CaO+SrO) is 0.9-1.6.

Wherein, the content of La$_2$O$_3$ is further restricted to be 0.05-1.2% by weight percentage.

Wherein, the content of CeO$_2$ is further restricted to be 0.05-1% by weight percentage.

Wherein, the glass fiber composition comprises the following components expressed as weight percentage:

| | |
|---|---|
| SiO$_2$ | 55.7-58.9% |
| Al$_2$O$_3$ | 15-19.9% |
| Y$_2$O$_3$ | 0.1-4.3% |
| La$_2$O$_3$ | 0.05-1.2% |
| CeO$_2$ | 0.05-1% |
| La$_2$O$_3$ + CeO$_2$ | 0.1-2% |
| CaO | 6-10% |
| MgO | 9.05-9.95% |
| SrO | less than or equal to 2% |
| Li$_2$O + Na$_2$O + K$_2$O | less than or equal to 0.99% |
| Li$_2$O | less than or equal to 0.65% |
| Fe$_2$O$_3$ | less than 1% |
| TiO$_2$ | 0.1-1.5% | wherein, the range of the weight percentage ratio C1=Y$_2$O$_3$/(Y$_2$O$_3$+La$_2$O$_3$+CeO$_2$) is greater than 0.6, the range of the weight percentage ratio C2=SiO$_2$/CaO is 5.8-9.3, and the range of the weight percentage ratio C3=MgO/(CaO+SrO) is 0.9-1.6.

Wherein, the glass fiber composition comprises the following components expressed as weight percentage:

| | |
|---|---|
| SiO$_2$ | 55.7-58.9% |
| Al$_2$O$_3$ | 15-19.9% |
| Y$_2$O$_3$ | 0.5-3.9% |
| La$_2$O$_3$ | 0.05-1.2% |
| CeO$_2$ | 0.05-1% |
| La$_2$O$_3$ + CeO$_2$ | 0.1-2% |
| CaO | 6-10% |
| MgO | 9.05-9.95% |
| SrO | less than or equal to 2% |
| Li$_2$O + Na$_2$O + K$_2$O | less than or equal to 0.99% |
| Li$_2$O | less than or equal to 0.65% |
| Fe$_2$O$_3$ | less than 1% |
| TiO$_2$ | 0.1-1% | wherein, the range of the weight percentage ratio C1=Y$_2$O$_3$/(Y$_2$O$_3$+La$_2$O$_3$+CeO$_2$) is greater than 0.7, the range of the weight percentage ratio C2=SiO$_2$/CaO is 6.3-8.5, and the range of the weight percentage ratio C3=MgO/(CaO+SrO) is 1-1.5.

Wherein, the glass fiber composition comprises the following components expressed as weight percentage:

| | |
|---|---|
| SiO$_2$ | 56.5-58.9% |
| Al$_2$O$_3$ | 16-19.5% |
| Y$_2$O$_3$ | 0.5-3.9% |
| La$_2$O$_3$ | 0.05-1.2% |
| CeO$_2$ | 0.05-1% |
| La$_2$O$_3$ + CeO$_2$ | 0.1-2% |
| CaO | 6.8-9.3% |
| MgO | 9.05-9.95% |
| SrO | less than or equal to 2% |
| Li$_2$O + Na$_2$O + K$_2$O | less than or equal to 0.99% |
| Li$_2$O | 0.05-0.55% |
| Fe$_2$O$_3$ | less than 1% |
| TiO$_2$ | 0.1-1% | wherein, the range of the weight percentage ratio C1=Y$_2$O$_3$/(Y$_2$O$_3$+La$_2$O$_3$+CeO$_2$) is 0.75-0.97, the range of the weight percentage ratio C2=SiO$_2$/CaO is 6.3-8.5, and the range of the weight percentage ratio C3=MgO/(CaO+SrO) is 1-1.5.

Wherein, the content of CaO is further restricted to be 8-9.3% by weight percentage.

Wherein, the total content of Li$_2$O+Na$_2$O+K$_2$O is further restricted to be 0.4-0.94% by weight percentage.

Wherein, the total content of Na$_2$O+K$_2$O is further restricted to be 0.15-0.55% by weight percentage.

Wherein, the range of the weight percentage ratio C2=SiO$_2$/CaO is further restricted to be 6.7-8.

Wherein, the range of the weight percentage ratio C3=MgO/(CaO+SrO) is further restricted to be 1.05-1.4.

Wherein, the range of the weight percentage ratio C4=La$_2$O$_3$/CeO$_2$ is further restricted to be greater than 1.

Wherein, the content of Y$_2$O$_3$ is further restricted to be 1.3-3.9% by weight percentage.

Wherein, the total content of Y$_2$O$_3$+La$_2$O$_3$+CeO$_2$ is further restricted to be 1.4-4.2% by weight percentage.

Wherein, the glass fiber composition can further comprise B$_2$O$_3$ with a content range of 0-3% by weight percentage.

According to another aspect of this invention, a glass fiber produced with said glass fiber composition is provided.

According to yet another aspect of this invention, a composite material incorporating said glass fiber is provided.

According to the high-modulus glass fiber composition of this invention, the main innovation is that, the composition introduces the rare earth oxides Y$_2$O$_3$, La$_2$O$_3$ and CeO$_2$, makes full use of the mixed rare earth effect between them, reasonably controls the ratios of Y$_2$O$_3$/(Y$_2$O$_3$+La$_2$O$_3$), La$_2$O$_3$/CeO$_2$, SiO$_2$/CaO and MgO/(CaO+SrO), reasonably designs the ranges of contents of Y$_2$O$_3$, La$_2$O$_3$, CeO$_2$, Li$_2$O, CaO, MgO, La$_2$O$_3$+CeO$_2$, Y$_2$O$_3$+La$_2$O$_3$+CeO$_2$, Na$_2$O+K$_2$O and Li$_2$O+Na$_2$O+K$_2$O, and makes full use of the mixed alkali earth effect of CaO, MgO and SrO and the mixed alkali effect of $K_2O$, $Na_2O$ and $Li_2O$; furthermore, the composition selectively introduces a small amount of $B_2O_3$.

Specifically, the high-modulus glass fiber composition according to the present invention comprises the following components expressed as weight percentage:

| | |
|---|---|
| $SiO_2$ | 55.7-58.9% |
| $Al_2O_3$ | 15-19.9% |
| $Y_2O_3$ | 0.1-4.3% |
| $La_2O_3$ | less than or equal to 1.5% |
| $CeO_2$ | less than or equal to 1.2% |
| CaO | 6-10% |
| MgO | 9.05-9.95% |
| SrO | less than or equal to 2% |
| $Li_2O + Na_2O + K_2O$ | less than or equal to 0.99% |
| $Li_2O$ | less than or equal to 0.65% |
| $Fe_2O_3$ | less than 1% |
| $TiO_2$ | 0.1-1.5% | wherein, the range of the weight percentage ratio $C1=Y_2O_3/(Y_2O_3+La_2O_3+CeO_2)$ is greater than 0.6.

The effect and content of each component in said glass fiber composition is described as follows:

$SiO_2$ is a main oxide forming the glass network and has the effect of stabilizing all the components. In the glass fiber composition of the present invention, the restricted content range of $SiO_2$ is 55.7-58.9% expressed as weight percentage. Preferably, the $SiO_2$ content range can be 56.5-58.9% expressed as weight percentage.

$Al_2O_3$ is another oxide forming the glass network. When combined with $SiO_2$, it can have a substantive effect on the mechanical properties of the glass. The restricted content range of $Al_2O_3$ in the glass fiber composition of this invention is 15-19.9% expressed as weight percentage. $Al_2O_3$ content being too low will make it impossible to have high mechanical properties; $Al_2O_3$ content being too high will cause the glass viscosity to be excessively high thereby resulting in melting and fining issues. Preferably, the range of $Al_2O_3$ content can be 16-19.5% expressed as weight percentage. More preferably, the range of $Al_2O_3$ content can be 16.7-19.3% expressed as weight percentage.

$Y_2O_3$ is an important rare earth oxide. The inventors have found that it has particular effects in improving elastic modulus and inhibiting crystallization tendency of the glass. $Y^{3+}$ ion is generally in the gaps of glass network as the network modifying ion, for $Y^{3+}$ ion is difficult to enter into the glass structure. $Y^{3+}$ ion has high coordination number, high field strength, high electric charge and strong accumulation ability, and can grab free oxygen to compensate network defect, improve the stability of glass structure and the elastic modulus of glass. Meanwhile, it also can effectively inhibit the movement and arrangement of other ions, thereby reducing crystallization tendency of glass. Additionally, the inventors have found that, increasing the content of $Y_2O_3$ does not lead to significant effect on the improvement of mechanical properties when the content of $Y_2O_3$ exceeds 4.3%, and the glass density would be significantly increased, thus restricting the improvement of specific modulus and specific strength; in this case, the specific modulus and specific strength even could be reduced under certain conditions, which is unfavorable for the lightweight of glass fiber.

$La_2O_3$ is also an important rare earth oxide. The inventors have found that, when used alone, $La_2O_3$ shows a weaker effect in increasing the modulus and inhibiting the crystallization, as compared with $Y_2O_3$. However, the synergistic effect of combination of rare earth oxides is remarkable when these two rare earth oxides are simultaneously used in a reasonably controlled ratio there between, and the effect on increasing the glass modulus and inhibiting the glass crystallization is unexpectedly superior to that of the separate use of $Y_2O_3$ or $La_2O_3$. In the inventors' view, $Y_2O_3$ and $La_2O_3$ are of the same group of oxides and their physical and chemical properties are similar except for having different coordination states. Generally, the yttrium ion is featured with six-coordination while the lanthanum ion with eight-coordination. Therefore, the combination of the two oxides with a reasonably designed ratio would have the following beneficial effects. First, it can offer more coordination structure of network modifying ions, the main structure being six-coordinated yttrium ion combined with the structure of eight-coordinate lanthanumd ion, which helps to improve the stability of glass structure and the elastic modulus of glass. Second, lanthanum oxide can increase the amount of free oxygen and promote more transitions from $[AlO_6]$ to $[AlO_4]$, thus further enhancing the integrity of glass structure and increasing the glass modulus. Third, since various ions are restricting each other, the probability of regular arrangement of ions will also be reduced when the temperature is lowered, thus helping to significantly reduce the growth rate of crystals and further improve the crystallization resistance of glass. However, as the molar mass and ionic radiuses of lanthanum are relatively large, and too many eight-coordinated ions would affect the stability of structure, the added amount of lanthanum should not be too high.

$CeO_2$ is an important rare earth glass fining agent. The inventors have found that, replacing part of $Y_2O_3$ or $La_2O_3$ with a small amount of $CeO_2$ can have a significant effect in increasing the glass modulus and inhibiting the glass crystallization, and the effect will be more pronounced when the three rare earth oxides, i.e., $Y_2O_3$, $La_2O_3$ and $CeO_2$, are used simultaneously with reasonably designed ratios there between. In the inventors' view, on the one hand, $CeO_2$ can provide more free oxygen to yttrium for compensating network defect; on the other hand, the three rare earth ions with different ionic radiuses and field strengths can enhance the compact stacking effect of the structure, which not only further enhances the integrity of glass structure and improves glass properties, but also strengthens the restraining force between the ions to improve the crystallization performance of the glass.

Therefore, in the glass fiber composition of the present invention, the restricted range of the content of $Y_2O_3$ is 0.1-4.3% expressed as weight percentage. Preferably, the restricted range of the content of $Y_2O_3$ can be 0.5-3.9% expressed as weight percentage. More preferably, the restricted range of the content of $Y_2O_3$ can be 1.3-3.9% expressed as weight percentage. The restricted range of the content of $La_2O_3$ is less than or equal to 1.5% expressed as weight percentage. Preferably, the restricted range of the content of $La_2O_3$ can be 0.05-1.2% expressed as weight percentage. The restricted range of the content of $CeO_2$ is less than or equal to 1.2% expressed as weight percentage. Preferably, the restricted range of the content of $CeO_2$ can be 0.05-1% expressed as weight percentage.

Meanwhile, the restricted range of the weight percentage ratio $C1=Y_2O_3/(Y_2O_3+La_2O_3+CeO_2)$ is greater than 0.6. Preferably, the restricted range of the weight percentage ratio $C1=Y_2O_3/(Y_2O_3+La_2O_3+CeO_2)$ can be greater than 0.7. More preferably, the restricted range of the weight percentage ratio $C1=Y_2O_3/(Y_2O_3+La_2O_3+CeO_2)$ can be 0.75-0.97. Meanwhile, the range of the total content of $La_2O_3+CeO_2$ can further be 0.1-2% expressed as weight percentage. The range of the weight percentage ratio C4=$La_2O_3$/$CeO_2$ can further be greater than 1. The range of the total content of $Y_2O_3$+$La_2O_3$+$CeO_2$ can further be 1.4-4.2% expressed as weight percentage.

CaO, MgO and SrO mainly have the effect of controlling glass crystallization, regulating glass viscosity, and controlling the hardening rate of molten glass. Unexpected effects especially on the control of glass crystallization have been obtained by controlling the contents of CaO, MgO and SrO and the ratios thereof. Generally, the crystalline phase after the crystallization of high-performance glasses based on an MgO—CaO—$Al_2O_3$—$SiO_2$ system mainly comprises diopside ($CaMgSi_2O_6$) and anorthite ($CaAl_2Si_2O_8$). In order to effectively inhibit the crystallization tendency of the two crystalline phases, reduce the liquidus temperature and the crystallization rate of glass, by reasonably designing the ranges of contents of CaO, MgO and SrO and the ratios thereof, making full use of the mixed alkali earth effect to achieve a compact stacking structure, more energy is needed for the crystal nucleuses to form and grow, thereby inhibiting the crystallization tendency of glass and effectively optimizing the hardening rate of molten glass. The inventors have found that, the content of MgO in the composition of this invention is greatly increased compared with the content of traditional R glass and improved R glass, and the composition can have higher elastic modulus, lower crystallization temperature and rate when the range of the content of MgO is rigidly kept at 9.05-9.95% expressed as weight percentage and the range of the weight percentage ratio of MgO/(CaO+SrO) is reasonably designed to be 0.9-1.6. The inventors have further found that, the growth of anorthite could be effectively controlled to inhibit the crystallization tendency of glass by reasonably controlling the ratio of $SiO_2$/CaO, as the growth momentum of diopside is relatively strong in the two crystals due to the relatively high content of MgO in the composition of this invention.

Therefore, in the glass fiber composition of the present invention, the restricted range of the content of MgO is 9.05-9.95% expressed as weight percentage. The restricted range of the content of CaO is 6-10% expressed as weight percentage. Preferably, the range of the content of CaO can be 6.8-9.3% expressed as weight percentage.

Additionally, in some technical solutions, the range of the content of CaO can further be 8-9.3% expressed as weight percentage. The range of the content of SrO can further be less than or equal to 2% expressed as weight percentage.

Meanwhile, the range of the weight percentage ratio C2=$SiO_2$/CaO can further be 5.8-9.3. Preferably, the range of the weight percentage ratio C2=$SiO_2$/CaO can be 6.3-8.5. More preferably, the range of the weight percentage ratio C2=$SiO_2$/CaO can be 6.7-8. The range of the weight percentage ratio C3=MgO/(CaO+SrO) can further be 0.9-1.6. Preferably, the range of the weight percentage ratio C3=MgO/(CaO+SrO) can be 1-1.5. More preferably, the range of the weight percentage ratio C3=MgO/(CaO+SrO) can be 1.05-1.4.

Both $K_2O$ and $Na_2O$ are good fluxing agents that can reduce glass viscosity. The inventors have found that, replacing $Na_2O$ with $K_2O$ while keeping the total amount of alkali metal oxides unchanged can reduce the crystallization tendency of glass and improve the fiberizing performance. $Li_2O$ can not only reduce the glass viscosity dramatically to improve the melting performance, but also noticeably help to improve mechanical properties, compared with $Na_2O$ and $K_2O$. In addition, a small amount of $Li_2O$ can provide considerable free oxygen, thereby promoting more aluminum ions to form tetrahedral coordination that would help strengthen the glass network and further reduce crystallization tendency of glass. But the added amount of alkali metal ions should not be too high, as the high content of alkali metal ions will reduce the corrosion resistance of glass. Additionally, the rare earth oxides have relatively strong alkalinity, and can play a similar role as the alkali metal oxides and the alkaline earth metal oxides in some respects. Therefore, in the glass fiber composition of the present invention, the range of the total content of $Li_2O$+$Na_2O$+$K_2O$ is less than or equal to 0.99% expressed as weight percentage. The range of the content of $Li_2O$ is less than or equal to 0.65% expressed as weight percentage. The range of the total content of $Li_2O$+$Na_2O$+$K_2O$ can further be 0.4-0.94% expressed as weight percentage. The range of the content of $Li_2O$ can further be 0.05-0.55% expressed as weight percentage. The range of the total content of $Na_2O$+$K_2O$ can further be 0.15-0.55% expressed as weight percentage.

The introduction of $Fe_2O_3$ facilitates the melting of glass and can also improve the crystallization properties of glass. However, since ferric ions and ferrous ions have coloring effects, the introduced amount should be limited. Therefore, in the glass fiber composition of the present invention, the restricted range of the content of $Fe_2O_3$ is less than 1% expressed as weight percentage.

$TiO_2$ can not only reduce the glass viscosity at high temperature, but also has a certain fluxing effect. However, since titanium ions have coloring effects, in the glass fiber composition of this invention, the restricted range of the content of $TiO_2$ is 0.1-1.5% expressed as weight percentage. Preferably, the range of $TiO_2$ content can be 0.1-1% expressed as weight percentage.

In the glass fiber composition of this invention, a small amount of $B_2O_3$ can be selectively introduced, which can further improve the crystallization performance of glass. Therefore, in the glass fiber composition of the present invention, the restricted range of the content of $B_2O_3$ can be 0-3% expressed as weight percentage.

In addition to aforementioned components, small amount of other components may be present in the glass composition according to the present invention, and the total weight percentage of the other components is less than or equal to 2%.

In the glass fiber composition of the present invention, the beneficial effects produced by the aforementioned selected ranges of the components will be explained through the specific experimental data provided below.

The following are embodiments of preferred content ranges of the components contained in the glass fiber composition according to the present invention.

PREFERRED EMBODIMENT 1

The high-modulus glass fiber composition according to the present invention comprises the following components expressed as weight percentage:

| | |
|---|---|
| $SiO_2$ | 55.7-58.9% |
| $Al_2O_3$ | 15-19.9% |
| $Y_2O_3$ | 0.1-4.3% |
| $La_2O_3$ | less than or equal to 1.5% |
| $CeO_2$ | less than or equal to 1.2% |
| CaO | 6-10% |
| MgO | 9.05-9.95% |
| SrO | less than or equal to 2% |
| $Li_2O$ + $Na_2O$ + $K_2O$ | less than or equal to 0.99% |
| $Li_2O$ | less than or equal to 0.65% |

| | |
|---|---|
| Fe$_2$O$_3$ | less than 1% |
| TiO$_2$ | 0.1-1.5% | wherein, the range of the weight percentage ratio C1=Y$_2$O$_3$/(Y$_2$O$_3$+La$_2$O$_3$+CeO$_2$) is greater than 0.6, and the range of the weight percentage ratio C2=SiO$_2$/CaO is 5.8-9.3.

PREFERRED EMBODIMENT 2

The high-modulus glass fiber composition according to the present invention comprises the following components expressed as weight percentage:

| | |
|---|---|
| SiO$_2$ | 55.7-58.9% |
| Al$_2$O$_3$ | 15-19.9% |
| Y$_2$O$_3$ | 0.1-4.3% |
| La$_2$O$_3$ | less than or equal to 1.5% |
| CeO$_2$ | less than or equal to 1.2% |
| CaO | 6-10% |
| MgO | 9.05-9.95% |
| SrO | less than or equal to 2% |
| Li$_2$O + Na$_2$O + K$_2$O | less than or equal to 0.99% |
| Li$_2$O | less than or equal to 0.65% |
| Fe$_2$O$_3$ | less than 1% |
| TiO$_2$ | 0.1-1.5% | wherein, the range of the weight percentage ratio C1=Y$_2$O$_3$/(Y$_2$O$_3$+La$_2$O$_3$+CeO$_2$) is 0.75-0.97.

PREFERRED EMBODIMENT 3

The high-modulus glass fiber composition according to the present invention comprises the following components expressed as weight percentage:

| | |
|---|---|
| SiO$_2$ | 55.7-58.9% |
| Al$_2$O$_3$ | 15-19.9% |
| Y$_2$O$_3$ | 0.1-4.3% |
| La$_2$O$_3$ | less than or equal to 1.5% |
| CeO$_2$ | less than or equal to 1.2% |
| CaO | 6-10% |
| MgO | 9.05-9.95% |
| SrO | less than or equal to 2% |
| Li$_2$O + Na$_2$O + K$_2$O | less than or equal to 0.99% |
| Li$_2$O | less than or equal to 0.65% |
| Fe$_2$O$_3$ | less than 1% |
| TiO$_2$ | 0.1-1.5% | wherein, the range of the weight percentage ratio C1=Y$_2$O$_3$/(Y$_2$O$_3$+La$_2$O$_3$+CeO$_2$) is greater than 0.6, the range of the weight percentage ratio C2=SiO$_2$/CaO is 5.8-9.3, and the range of the weight percentage ratio C3=MgO/(CaO+SrO) is 0.9-1.6.

PREFERRED EMBODIMENT 4

The high-modulus glass fiber composition according to the present invention comprises the following components expressed as weight percentage:

| | |
|---|---|
| SiO$_2$ | 55.7-58.9% |
| Al$_2$O$_3$ | 15-19.9% |
| Y$_2$O$_3$ | 0.1-4.3% |
| La$_2$O$_3$ | 0.05-1.2% |
| CeO$_2$ | less than or equal to 1.2% |
| La$_2$O$_3$ + CeO$_2$ | 0.1-2% |
| CaO | 6-10% |
| MgO | 9.05-9.95% |
| SrO | less than or equal to 2% |
| Li$_2$O + Na$_2$O + K$_2$O | less than or equal to 0.99% |
| Li$_2$O | less than or equal to 0.65% |
| Fe$_2$O$_3$ | less than 1% |
| TiO$_2$ | 0.1-1.5% | wherein, the range of the weight percentage ratio C1=Y$_2$O$_3$/(Y$_2$O$_3$+La$_2$O$_3$+CeO$_2$) is greater than 0.6, the range of the weight percentage ratio C2=SiO$_2$/CaO is 5.8-9.3, and the range of the weight percentage ratio C3=MgO/(CaO+SrO) is 0.9-1.6.

PREFERRED EMBODIMENT 5

The high-modulus glass fiber composition according to the present invention comprises the following components expressed as weight percentage:

| | |
|---|---|
| SiO$_2$ | 55.7-58.9% |
| Al$_2$O$_3$ | 15-19.9% |
| Y$_2$O$_3$ | 0.1-4.3% |
| La$_2$O$_3$ | 0.05-1.2% |
| CeO$_2$ | 0.05-1% |
| La$_2$O$_3$ + CeO$_2$ | 0.1-2% |
| CaO | 6-10% |
| MgO | 9.05-9.95% |
| SrO | less than or equal to 2% |
| Li$_2$O + Na$_2$O + K$_2$O | less than or equal to 0.99% |
| Li$_2$O | less than or equal to 0.65% |
| Fe$_2$O$_3$ | less than 1% |
| TiO$_2$ | 0.1-1.5% | wherein, the range of the weight percentage ratio C1=Y$_2$O$_3$/(Y$_2$O$_3$+La$_2$O$_3$+CeO$_2$) is greater than 0.6, the range of the weight percentage ratio C2=SiO$_2$/CaO is 5.8-9.3, and the range of the weight percentage ratio C3=MgO/(CaO+SrO) is 0.9-1.6.

PREFERRED EMBODIMENT 6

The high-modulus glass fiber composition according to the present invention comprises the following components expressed as weight percentage:

| | |
|---|---|
| SiO$_2$ | 55.7-58.9% |
| Al$_2$O$_3$ | 15-19.9% |
| Y$_2$O$_3$ | 0.5-3.9% |
| La$_2$O$_3$ | 0.05-1.2% |
| CeO$_2$ | 0.05-1% |
| La$_2$O$_3$ + CeO$_2$ | 0.1-2% |
| CaO | 6-10% |
| MgO | 9.05-9.95% |
| SrO | less than or equal to 2% |
| Li$_2$O + Na$_2$O + K$_2$O | less than or equal to 0.99% |
| Li$_2$O | less than or equal to 0.65% |
| Fe$_2$O$_3$ | less than 1% |
| TiO$_2$ | 0.1-1% | wherein, the range of the weight percentage ratio C1=Y$_2$O$_3$/(Y$_2$O$_3$+La$_2$O$_3$+CeO$_2$) is greater than 0.7, the range of the weight percentage ratio C2=SiO$_2$/CaO is 6.3-8.5, and the range of the weight percentage ratio C3=MgO/(CaO+SrO) is 1-1.5.

PREFERRED EMBODIMENT 7

The high-modulus glass fiber composition according to the present invention comprises the following components expressed as weight percentage:

| | |
|---|---|
| $SiO_2$ | 56.5-58.9% |
| $Al_2O_3$ | 16-19.5% |
| $Y_2O_3$ | 0.5-3.9% |
| $La_2O_3$ | 0.05-1.2% |
| $CeO_2$ | 0.05-1% |
| $La_2O_3 + CeO_2$ | 0.1-2% |
| CaO | 6.8-9.3% |
| MgO | 9.05-9.95% |
| SrO | less than or equal to 2% |
| $Li_2O + Na_2O + K_2O$ | less than or equal to 0.99% |
| $Li_2O$ | 0.05-0.55% |
| $Fe_2O_3$ | less than 1% |
| $TiO_2$ | 0.1-1% | wherein, the range of the weight percentage ratio $C1=Y_2O_3/(Y_2O_3+La_2O_3+CeO_2)$ is 0.75-0.97, the range of the weight percentage ratio $C2=SiO_2/CaO$ is 6.3-8.5, and the range of the weight percentage ratio $C3=MgO/(CaO+SrO)$ is 1-1.5.

PREFERRED EMBODIMENT 8

The high-modulus glass fiber composition according to the present invention comprises the following components expressed as weight percentage:

| | |
|---|---|
| $SiO_2$ | 55.7-58.9% |
| $Al_2O_3$ | 15-19.9% |
| $Y_2O_3$ | 0.1-4.3% |
| $La_2O_3$ | 0.05-1.2% |
| $CeO_2$ | 0.05-1% |
| $La_2O_3 + CeO_2$ | 0.1-2% |
| CaO | 8-9.3% |
| MgO | 9.05-9.95% |
| SrO | less than or equal to 2% |
| $Li_2O + Na_2O + K_2O$ | less than or equal to 0.99% |
| $Li_2O$ | less than or equal to 0.65% |
| $Fe_2O_3$ | less than 1% |
| $TiO_2$ | 0.1-1.5% | wherein, the range of the weight percentage ratio $C1=Y_2O_3/(Y_2O_3+La_2O_3+CeO_2)$ is greater than 0.6, the range of the weight percentage ratio $C2=SiO_2/CaO$ is 5.8-9.3, and the range of the weight percentage ratio $C3=MgO/(CaO+SrO)$ is 0.9-1.6.

PREFERRED EMBODIMENT 9

The high-modulus glass fiber composition according to the present invention comprises the following components expressed as weight percentage:

| | |
|---|---|
| $SiO_2$ | 55.7-58.9% |
| $Al_2O_3$ | 15-19.9% |
| $Y_2O_3$ | 0.1-4.3% |
| $La_2O_3$ | 0.05-1.2% |
| $CeO_2$ | 0.05-1% |
| $La_2O_3 + CeO_2$ | 0.1-2% |
| CaO | 6-10% |
| MgO | 9.05-9.95% |
| SrO | less than or equal to 2% |
| $Li_2O + Na_2O + K_2O$ | 0.4-0.94% |
| $Li_2O$ | less than or equal to 0.65% |
| $Fe_2O_3$ | less than 1% |
| $TiO_2$ | 0.1-1.5% | wherein, the range of the weight percentage ratio $C1=Y_2O_3/(Y_2O_3+La_2O_3+CeO_2)$ is greater than 0.6, the range of the weight percentage ratio $C2=SiO_2/CaO$ is 5.8-9.3, and the range of the weight percentage ratio $C3=MgO/(CaO+SrO)$ is 0.9-1.6.

PREFERRED EMBODIMENT 10

The high-modulus glass fiber composition according to the present invention comprises the following components expressed as weight percentage:

| | |
|---|---|
| $SiO_2$ | 55.7-58.9% |
| $Al_2O_3$ | 15-19.9% |
| $Y_2O_3$ | 0.5-3.9% |
| $La_2O_3$ | 0.05-1.2% |
| $CeO_2$ | 0.05-1% |
| $La_2O_3 + CeO_2$ | 0.1-2% |
| CaO | 6-10% |
| MgO | 9.05-9.95% |
| SrO | less than or equal to 2% |
| $Li_2O + Na_2O + K_2O$ | less than or equal to 0.99% |
| $Li_2O$ | less than or equal to 0.65% |
| $Fe_2O_3$ | less than 1% |
| $TiO_2$ | 0.1-1% | wherein, the range of the weight percentage ratio $C1=Y_2O_3/(Y_2O_3+La_2O_3+CeO_2)$ is greater than 0.7, the range of the weight percentage ratio $C2=SiO_2/CaO$ is 6.7-8, and the range of the weight percentage ratio $C3=MgO/(CaO+SrO)$ is 1-1.5.

PREFERRED EMBODIMENT 11

The high-modulus glass fiber composition according to the present invention comprises the following components expressed as weight percentage:

| | |
|---|---|
| $SiO_2$ | 55.7-58.9% |
| $Al_2O_3$ | 15-19.9% |
| $Y_2O_3$ | 0.5-3.9% |
| $La_2O_3$ | 0.05-1.2% |
| $CeO_2$ | 0.05-1% |
| $La_2O_3 + CeO_2$ | 0.1-2% |
| CaO | 6-10% |
| MgO | 9.05-9.95% |
| SrO | less than or equal to 2% |
| $Li_2O + Na_2O + K_2O$ | less than or equal to 0.99% |
| $Li_2O$ | less than or equal to 0.65% |
| $Fe_2O_3$ | less than 1% |
| $TiO_2$ | 0.1-1% | wherein, the range of the weight percentage ratio $C1=Y_2O_3/(Y_2O_3+La_2O_3+CeO_2)$ is greater than 0.7, the range of the weight percentage ratio $C2=SiO_2/CaO$ is 6.3-8.5, and the range of the weight percentage ratio $C3=MgO/(CaO+SrO)$ is 1.05-1.4.

PREFERRED EMBODIMENT 12

The high-modulus glass fiber composition according to the present invention comprises the following components expressed as weight percentage:

| | |
|---|---|
| $SiO_2$ | 55.7-58.9% |
| $Al_2O_3$ | 15-19.9% |
| $Y_2O_3$ | 0.1-4.3% |
| $La_2O_3$ | less than or equal to 1.5% |
| $CeO_2$ | less than or equal to 1.2% |
| $La_2O_3 + CeO_2$ | 0.1-2% |
| CaO | 6-10% |
| MgO | 9.05-9.95% |
| SrO | less than or equal to 2% |
| $Li_2O + Na_2O + K_2O$ | less than or equal to 0.99% |
| $Li_2O$ | less than or equal to 0.65% |
| $Fe_2O_3$ | less than 1% |
| $TiO_2$ | 0.1-1.5% | wherein, the range of the weight percentage ratio $C1=Y_2O_3/(Y_2O_3+La_2O_3+CeO_2)$ is greater than 0.6, and the range of the weight percentage ratio $C4=La_2O_3/CeO_2$ is greater than 1.

PREFERRED EMBODIMENT 13

The high-modulus glass fiber composition according to the present invention comprises the following components expressed as weight percentage:

| | |
|---|---|
| $SiO_2$ | 55.7-58.9% |
| $Al_2O_3$ | 15-19.9% |
| $Y_2O_3$ | 1.3-3.9% |
| $La_2O_3$ | 0.05-1.2% |
| $CeO_2$ | 0.05-1% |
| $La_2O_3 + CeO_2$ | 0.1-2% |
| CaO | 6-10% |
| MgO | 9.05-9.95% |
| SrO | less than or equal to 2% |
| $Li_2O + Na_2O + K_2O$ | less than or equal to 0.99% |
| $Li_2O$ | less than or equal to 0.65% |
| $Fe_2O_3$ | less than 1% |
| $TiO_2$ | 0.1-1% | wherein, the range of the weight percentage ratio $C1=Y_2O_3/(Y_2O_3+La_2O_3+CeO_2)$ is greater than 0.7, the range of the weight percentage ratio $C2=SiO_2/CaO$ is 6.3-8.5, and the range of the weight percentage ratio $C3=MgO/(CaO+SrO)$ is 1-1.5.

PREFERRED EMBODIMENT 14

The high-modulus glass fiber composition according to the present invention comprises the following components expressed as weight percentage:

| | |
|---|---|
| $SiO_2$ | 55.7-58.9% |
| $Al_2O_3$ | 15-19.9% |
| $Y_2O_3$ | 0.5-3.9% |
| $La_2O_3$ | 0.05-1.2% |
| $CeO_2$ | 0.05-1% |
| $La_2O_3 + CeO_2$ | 0.1-2% |
| $Y_2O_3 + La_2O_3 + CeO_2$ | 1.4-4.2% |
| CaO | 6-10% |
| MgO | 9.05-9.95% |
| SrO | less than or equal to 2% |
| $Li_2O + Na_2O + K_2O$ | less than or equal to 0.99% |
| $Li_2O$ | less than or equal to 0.65% |
| $Fe_2O_3$ | less than 1% |
| $TiO_2$ | 0.1-1% | wherein, the range of the weight percentage ratio $C1=Y_2O_3/(Y_2O_3+La_2O_3+CeO_2)$ is greater than 0.7, the range of the weight percentage ratio $C2=SiO_2/CaO$ is 6.3-8.5, and the range of the weight percentage ratio $C3=MgO/(CaO+SrO)$ is 1-1.5.

DETAILED DESCRIPTION OF THE INVENTION

In order to better clarify the purposes, technical solutions and advantages of the examples of the present invention, the technical solutions in the examples of the present invention are clearly and completely described below. Obviously, the examples described herein are just part of the examples of the present invention and are not all the examples. All other exemplary embodiments obtained by one skilled in the art on the basis of the examples in the present invention without performing creative work shall all fall into the scope of protection of the present invention. What needs to be made clear is that, as long as there is no conflict, the examples and the features of examples in the present application can be arbitrarily combined with each other.

The basic concept of the present invention is that, the glass fiber composition comprises the following components expressed as percentage by weight: $SiO_2$ 55.7-58.9%, $Al_2O_3$ 15-19.9%, $Y_2O_3$ 0.1-4.3%, $La_2O_3$ less than or equal to 1.5%, $CeO_2$ less than or equal to 1.2%, CaO 6-10%, MgO 9.05-9.95%, SrO less than or equal to 2%, $Li_2O+Na_2O+K_2O$ less than or equal to 0.99%, $Li_2O$ less than or equal to 0.65%, $Fe_2O_3$ less than 1% and $TiO_2$ 0.1-1.5%, and the range of the weight percentage ratio $C1=Y_2O_3/(Y_2O_3+La_2O_3+CeO_2)$ is greater than 0.6. The composition can not only significantly improve glass modulus, but also solve the production problems of traditional high-modulus glass, such as high crystallization risk, fining difficulty and the difficulty of realizing efficient large-scale tank furnace production. The composition can significantly reduce liquidus temperature, crystallization rate of molten glass and bubble amount under the same conditions, and therefore is more suitable for large-scale tank furnace production of high-modulus fiberglass with low bubble amount.

The specific content values of $SiO_2$, $Al_2O_3$, $Y_2O_3$, $La_2O_3$, $CeO_2$, CaO, MgO, $Li_2O$, $Na_2O$, $K_2O$, $Fe_2O_3$, $TiO_2$ and SrO in the glass fiber composition of the present invention are selected to be used in the examples, which are compared with the properties of S glass, traditional R glass and improved R glass in terms of the following six property parameters:

(1) Forming temperature, the temperature at which the glass melt has a viscosity of $10^3$ poise.

(2) Liquidus temperature, the temperature at which the crystal nucleuses begin to form when the glass melt cools off, i.e., the upper limit temperature for glass crystallization.

(3) ΔT value, which is the temperature differential between the forming temperature and the liquidus temperature and indicates the temperature range at which fiber drawing can be performed.

(4) Crystallization peak temperature, the temperature of the strongest crystallization peak in the DTA (Differential Thermal Analysis) test. Generally, the higher the temperature is, the more energy that the crystal nucleuses need to grow, and the smaller crystallization tendency of glass is.

(5) Elastic modulus, the modulus in the longitudinal direction indicating the ability of glass to resist elastic deformation, which is to be measured according to ASTM2343.

(6) Amount of bubbles, to be determined approximately in a procedure set out as follows: Use specific moulds to compress the batch materials in each example into samples of same dimension, which will then be placed on the sample platform of a heating microscope. Heat the glass samples according to standard procedures up to the pre-set spatial temperature 1500° C., and then the glass sample is cooled off to the ambient temperature without heat preservation. Finally, each of the glass samples is examined microscopically under a polarizing microscope to determine the amount of bubbles in the samples. Wherein, the amount of bubbles is identified according to a specific scope of image of the microscope.

The aforementioned six parameters and the methods of measuring them are well-known to one skilled in the art. Therefore, the aforementioned parameters can be effectively used to explain the properties of the glass fiber composition of the present invention.

The specific procedures for the experiments are as follows: Each component can be acquired from the appropriate raw materials; the raw materials are mixed in the appropriate proportions so that each component reaches the final expected weight percentage; the mixed batch is melted and clarified; then the molten glass is drawn out through the tips of the bushings, thereby forming the glass fiber; the glass fiber is attenuated onto the rotary collet of a winder to form cakes or packages. Of course, conventional methods can be used to deeply process these glass fibers to meet the expected requirements.

The exemplary embodiments of the glass fiber composition according to the present invention are given below.

EXAMPLE 1

| | |
|---|---|
| $SiO_2$ | 58.2% |
| $Al_2O_3$ | 18.0% |
| CaO | 8.2% |
| MgO | 9.8% |
| $Y_2O_3$ | 3.4% |
| $La_2O_3$ | 0.43% |
| $CeO_2$ | 0.1% |
| $Na_2O$ | 0.13% |
| $K_2O$ | 0.30% |
| $Li_2O$ | 0.49% |
| $Fe_2O_3$ | 0.46% |
| $TiO_2$ | 0.49% | wherein, the weight percentage ratio $C1=Y_2O_3/(Y_2O_3+La_2O_3+CeO_2)$ is 0.86, the weight percentage ratio $C2=SiO_2/CaO$ is 7.11, the weight percentage ratio $C3=MgO/(CaO+SrO)$ is 1.20, and the weight percentage ratio $C4=La_2O_3/CeO_2$ is 4.3.

In Example 1, the measured values of the six parameters are respectively:

| | |
|---|---|
| Forming temperature | 1298° C. |
| Liquidus temperature | 1198° C. |
| ΔT | 100° C. |
| Crystallization peak temperature | 1037° C. |
| Elastic modulus | 97.4 GPa |
| Amount of bubbles | 3 |

EXAMPLE 2

| | |
|---|---|
| $SiO_2$ | 57.8% |
| $Al_2O_3$ | 19.1% |
| CaO | 7.8% |
| MgO | 9.5% |
| $Y_2O_3$ | 3.5% |
| $La_2O_3$ | 0.25% |
| $CeO_2$ | 0.15% |
| $Na_2O$ | 0.20% |
| $K_2O$ | 0.23% |
| $Li_2O$ | 0.51% |
| $Fe_2O_3$ | 0.46% |
| $TiO_2$ | 0.50% | wherein, the weight percentage ratio $C1=Y_2O_3/(Y_2O_3+La_2O_3+CeO_2)$ is 0.90, the weight percentage ratio $C2=SiO_2/CaO$ is 7.41, the weight percentage ratio $C3=MgO/(CaO+SrO)$ is 1.22, and the weight percentage ratio $C4=La_2O_3/CeO_2$ is 1.67.

In Example 2, the measured values of the six parameters are respectively:

| | |
|---|---|
| Forming temperature | 1299° C. |
| Liquidus temperature | 1198° C. |
| ΔT | 101° C. |
| Crystallization peak temperature | 1038° C. |
| Elastic modulus | 98.5 GPa |
| Amount of bubbles | 2 |

EXAMPLE 3

| | |
|---|---|
| $SiO_2$ | 58.5% |
| $Al_2O_3$ | 17.5% |
| CaO | 8.1% |
| MgO | 9.8% |
| $Y_2O_3$ | 3.9% |
| $La_2O_3$ | 0.25% |
| $CeO_2$ | 0.05% |
| $Na_2O$ | 0.11% |
| $K_2O$ | 0.31% |
| $Li_2O$ | 0.50% |
| $Fe_2O_3$ | 0.46% |
| $TiO_2$ | 0.52% | wherein, the weight percentage ratio $C1=Y_2O_3/(Y_2O_3+La_2O_3+CeO_2)$ is 0.93, the weight percentage ratio $C2=SiO_2/CaO$ is 7.22, the weight percentage ratio $C3=MgO/(CaO+SrO)$ is 1.21, and the weight percentage ratio $C4=La_2O_3/CeO_2$ is 5.0.

In Example 3, the measured values of the six parameters are respectively:

| | |
|---|---|
| Forming temperature | 1298° C. |
| Liquidus temperature | 1200° C. |
| ΔT | 98° C. |
| Crystallization peak temperature | 1039° C. |
| Elastic modulus | 99.4 GPa |
| Amount of bubbles | 3 |

EXAMPLE 4

| | |
|---|---|
| $SiO_2$ | 58.1% |
| $Al_2O_3$ | 18.3% |
| CaO | 8.1% |
| MgO | 9.8% |
| $Y_2O_3$ | 3.2% |
| $La_2O_3$ | 0.3% |
| $CeO_2$ | 0.1% |
| $Na_2O$ | 0.14% |
| $K_2O$ | 0.35% |

-continued

| | |
|---|---|
| Li$_2$O | 0.43% |
| Fe$_2$O$_3$ | 0.46% |
| TiO$_2$ | 0.72% | wherein, the weight percentage ratio C1=Y$_2$O$_3$/(Y$_2$O$_3$+La$_2$O$_3$+CeO$_2$) is 0.89, the weight percentage ratio C2=SiO$_2$/CaO is 7.17, the weight percentage ratio C3=MgO/(CaO+SrO) is 1.21, and the weight percentage ratio C4=La$_2$O$_3$/CeO$_2$ is 3.0.

In Example 4, the measured values of the six parameters are respectively:

| | |
|---|---|
| Forming temperature | 1298° C. |
| Liquidus temperature | 1201° C. |
| ΔT | 97° C. |
| Crystallization peak temperature | 1035° C. |
| Elastic modulus | 96.8 GPa |
| Amount of bubbles | 3 |

EXAMPLE 5

| | |
|---|---|
| SiO$_2$ | 58.5% |
| Al$_2$O$_3$ | 17.4% |
| CaO | 8.05% |
| MgO | 9.8% |
| Y$_2$O$_3$ | 3.6% |
| La$_2$O$_3$ | 0.07% |
| CeO$_2$ | 0.05% |
| Na$_2$O | 0.11% |
| K$_2$O | 0.31% |
| Li$_2$O | 0.51% |
| Fe$_2$O$_3$ | 0.44% |
| TiO$_2$ | 0.46% |
| SrO | 0.6% | wherein, the weight percentage ratio C1=Y$_2$O$_3$/(Y$_2$O$_3$+La$_2$O$_3$+CeO$_2$) is 0.97, the weight percentage ratio C2=SiO$_2$/CaO is 7.27, the weight percentage ratio C3=MgO/(CaO+SrO) is 1.22, and the weight percentage ratio C4=La$_2$O$_3$/CeO$_2$ is 1.4.

In Example 5, the measured values of the six parameters are respectively:

| | |
|---|---|
| Forming temperature | 1298° C. |
| Liquidus temperature | 1202° C. |
| ΔT | 96° C. |
| Crystallization peak temperature | 1035° C. |
| Elastic modulus | 98.1 |
| Amount of bubbles | 4 |

Comparisons of the property parameters of the aforementioned examples and other examples of the glass fiber composition of the present invention with those of the S glass, traditional R glass and improved R glass are further made below by way of tables, wherein the component contents of the glass fiber composition are expressed as weight percentage. What needs to be made clear is that the total amount of the components in the examples is slightly less than 100%, and it should be understood that the remaining amount is trace impurities or a small amount of components which cannot be analyzed.

TABLE 1A

| | | A1 | A2 | A3 | A4 | A5 | A6 | A7 |
|---|---|---|---|---|---|---|---|---|
| Component | SiO$_2$ | 58.4 | 58.5 | 58.1 | 58.1 | 58.1 | 58.6 | 58.3 |
| | Al$_2$O$_3$ | 19.3 | 17.4 | 18.3 | 17.7 | 18.3 | 19.6 | 17.9 |
| | CaO | 8.1 | 8.05 | 6.8 | 8.1 | 8.1 | 8.7 | 8.3 |
| | MgO | 9.95 | 9.8 | 9.8 | 9.8 | 9.8 | 9.9 | 9.9 |
| | Y$_2$O$_3$ | 0.25 | 3.6 | 3.2 | 3.2 | 3.2 | 0.5 | 2.6 |
| | La$_2$O$_3$ | 0.1 | 0.07 | 0.3 | — | 0.3 | 0.2 | 1.2 |
| | CeO$_2$ | 0.05 | 0.05 | 0.1 | 1.0 | 0.1 | 0.05 | — |
| | Na$_2$O | 0.14 | 0.11 | 0.14 | 0.14 | 0.14 | 0.15 | 0.13 |
| | K$_2$O | 0.19 | 0.31 | 0.35 | 0.35 | 0.35 | 0.19 | 0.26 |
| | Li$_2$O | 0.64 | 0.51 | 0.43 | 0.43 | 0.43 | 0.65 | 0.51 |
| | Fe$_2$O$_3$ | 0.53 | 0.44 | 0.46 | 0.46 | 0.46 | 0.46 | 0.44 |
| | TiO$_2$ | 1.35 | 0.46 | 0.72 | 0.72 | 0.72 | 1.0 | 0.46 |
| | SrO | 1.0 | 0.6 | 1.3 | — | — | — | — |
| Ratio | C1 | 0.63 | 0.97 | 0.89 | 0.76 | 0.89 | 0.67 | 0.68 |
| | C2 | 7.21 | 7.27 | 8.54 | 7.17 | 7.17 | 6.74 | 7.02 |
| | C3 | 1.23 | 1.22 | 1.44 | 1.21 | 1.21 | 1.14 | 1.18 |
| | C4 | 2.0 | 1.4 | 3.0 | — | 3.0 | 4.0 | — |
| Parameter | Forming temperature/° C. | 1300 | 1298 | 1303 | 1297 | 1298 | 1305 | 1298 |
| | Liquidus temperature/° C. | 1208 | 1202 | 1203 | 1205 | 1201 | 1208 | 1205 |
| | ΔT/° C. | 92 | 96 | 100 | 92 | 97 | 97 | 93 |
| | Crystallization peak temperature/° C. | 1032 | 1035 | 1036 | 1032 | 1035 | 1032 | 1031 |
| | Elastic modulus/GPa | 93.8 | 98.1 | 97.4 | 96.1 | 96.8 | 94.2 | 95.6 |
| | Amount of bubbles/pcs | 6 | 4 | 5 | 2 | 4 | 5 | 5 |

TABLE 1B

| | | A8 | A9 | A10 | A11 | A12 | A13 | A14 |
|---|---|---|---|---|---|---|---|---|
| Component | $SiO_2$ | 58.6 | 57.8 | 57.8 | 57.8 | 57.7 | 58.9 | 58.1 |
| | $Al_2O_3$ | 18.1 | 19.1 | 19.1 | 19.1 | 19.05 | 15.9 | 19.5 |
| | CaO | 7.5 | 7.8 | 7.8 | 7.8 | 8.6 | 9.3 | 8.3 |
| | MgO | 9.4 | 9.5 | 9.5 | 9.5 | 9.05 | 9.95 | 9.95 |
| | $Y_2O_3$ | 4.3 | 3.5 | 3.5 | 3.5 | 3.2 | 3.5 | 1.5 |
| | $La_2O_3$ | 0.15 | 0.25 | 0.4 | — | 0.4 | 0.35 | 0.55 |
| | $CeO_2$ | 0.05 | 0.15 | — | — | 0.1 | 0.15 | 0.15 |
| | $Na_2O$ | 0.14 | 0.20 | 0.20 | 0.20 | 0.20 | 0.17 | 0.13 |
| | $K_2O$ | 0.40 | 0.23 | 0.23 | 0.23 | 0.23 | 0.26 | 0.21 |
| | $Li_2O$ | 0.25 | 0.51 | 0.51 | 0.51 | 0.51 | 0.49 | 0.61 |
| | $Fe_2O_3$ | 0.51 | 0.46 | 0.46 | 0.46 | 0.46 | 0.39 | 0.44 |
| | $TiO_2$ | 0.60 | 0.50 | 0.50 | 0.90 | 0.50 | 0.64 | 0.56 |
| | SrO | — | — | — | — | — | — | — |
| Ratio | C1 | 0.96 | 0.90 | 0.90 | 1.0 | 0.86 | 0.90 | 0.68 |
| | C2 | 7.81 | 7.41 | 7.41 | 7.41 | 6.71 | 6.33 | 7.0 |
| | C3 | 1.25 | 1.22 | 1.22 | 1.22 | 1.05 | 1.07 | 1.20 |
| | C4 | 3.0 | 1.67 | — | — | 4.0 | 2.33 | 3.67 |
| Parameter | Forming temperature/° C. | 1298 | 1299 | 1298 | 1300 | 1299 | 1296 | 1304 |
| | Liquidus temperature/° C. | 1200 | 1198 | 1204 | 1210 | 1203 | 1206 | 1203 |
| | ΔT/° C. | 98 | 101 | 94 | 90 | 96 | 90 | 101 |
| | Crystallization peak temperature/° C. | 1040 | 1038 | 1033 | 1024 | 1035 | 1033 | 1032 |
| | Elastic modulus/GPa | 98.4 | 98.5 | 97.0 | 96.0 | 96.6 | 96.0 | 94.6 |
| | Amount of bubbles/pcs | 3 | 2 | 5 | 8 | 4 | 3 | 4 |

TABLE 1C

| | | A15 | A16 | A17 | A18 | S glass | Traditional R glass | Improved R glass |
|---|---|---|---|---|---|---|---|---|
| Component | $SiO_2$ | 58.1 | 57.8 | 58.5 | 58.2 | 65 | 60 | 60.75 |
| | $Al_2O_3$ | 19.05 | 19.3 | 17.5 | 18.0 | 25 | 25 | 15.8 |
| | CaO | 7.85 | 7.6 | 8.1 | 8.2 | — | 9 | 13.9 |
| | MgO | 9.95 | 9.7 | 9.8 | 9.8 | 10 | 6 | 7.9 |
| | $Y_2O_3$ | 2.5 | 3.4 | 3.9 | 3.4 | — | — | — |
| | $La_2O_3$ | 0.4 | 0.2 | 0.25 | 0.43 | — | — | — |
| | $CeO_2$ | 0.2 | 0.1 | 0.05 | 0.1 | — | — | — |
| | $Na_2O$ | 0.23 | 0.21 | 0.11 | 0.13 | trace amount | trace amount | 0.73 |
| | $K_2O$ | 0.33 | 0.46 | 0.31 | 0.30 | trace amount | trace amount | — |
| | $Li_2O$ | 0.34 | 0.19 | 0.50 | 0.49 | — | — | 0.48 |
| | $Fe_2O_3$ | 0.46 | 0.46 | 0.46 | 0.46 | trace amount | trace amount | 0.18 |
| | $TiO_2$ | 0.59 | 0.58 | 0.52 | 0.49 | trace amount | trace amount | 0.12 |
| | SrO | — | — | — | — | — | — | — |
| Ratio | C1 | 0.81 | 0.92 | 0.93 | 0.86 | — | — | — |
| | C2 | 7.40 | 7.61 | 7.22 | 7.11 | — | 6.67 | 4.37 |
| | C3 | 1.27 | 1.28 | 1.21 | 1.20 | — | 0.67 | 0.57 |
| | C4 | 2.0 | 2.0 | 5.0 | 4.3 | — | — | — |
| Parameter | Forming temperature/° C. | 1301 | 1305 | 1298 | 1298 | 1571 | 1430 | 1278 |
| | Liquidus temperature/° C. | 1203 | 1203 | 1200 | 1198 | 1470 | 1350 | 1210 |
| | ΔT/° C. | 98 | 102 | 98 | 100 | 101 | 80 | 68 |
| | Crystallization peak temperature/° C. | 1035 | 1036 | 1039 | 1037 | — | 1010 | 1016 |
| | Elastic modulus/GPa | 95.5 | 96.9 | 99.4 | 97.4 | 89 | 88 | 87 |
| | Amount of bubbles/pcs | 4 | 4 | 3 | 3 | 40 | 30 | 25 |

It can be seen from the values in the above tables that, compared with the S glass and traditional R glass, the glass fiber composition of the present invention has the following advantages: (1) Much higher elastic modulus. (2) Much lower liquidus temperature, which helps to reduce crystallization risk and increase the fiber drawing efficiency; much higher crystallization peak temperature, which means more energy is needed for the crystal nucleuses to form and grow during the crystallization process, that is to say, the crystallization rate of the molten glass of the present invention is lower under the same condition. (3) Much lower amount of bubbles, which means the fining performance of the molten glass of the present invention is excellent.

The S glass and traditional R glass cannot enable tank furnace production. In order to reduce the difficulty of tank furnace production, the improved traditional R glass sacrifices some of the glass properties to lower the liquidus temperature and forming temperature. By contrast, the glass fiber composition of the present invention can not only provide sufficiently low liquidus temperature and less crystallization rate, but also be suitable for tank furnace production, greatly improve the elasticity modulus of glass, and resolve the bottleneck that the modulus of S glass and R glass cannot be improved with the growth of the production scale.

Thus, the glass fiber composition of the present invention makes a breakthrough in elasticity modulus, crystallization properties and fining performance of the glass, as compared with the mainstream high-modulus glasses, and greatly improves the elastic modulus, reduces the crystallization risk of molten glass and bubble amount under the same conditions, and therefore is more suitable for large-scale tank furnace production of high-modulus fiberglass with low bubble amount.

Additionally, the glass fiber composition comprising three kinds of rare earth oxides, as compared with the glass fiber composition comprising yttrium oxide as the only rare earth oxide (see Example A11), has the following exceptional advantages: (a) Much higher crystallization peak temperature, which means more energy is needed for the crystal nucleuses to form and grow during the crystallization process, that is to say, the composition has lower crystallization rate under the same condition; and has lower liquidus temperature, which helps to reduce crystallization risk and increase the fiber drawing efficiency. (b) Much higher elastic modulus. (c) Much lower amount of bubbles, which means the fining performance of the molten glass of the present invention is excellent. For example, the crystallization peak temperature of Example A9 was increased by 14° C., the liquidus temperature was decreased by 12° C., the elastic modulus was increased by 2.5 GPa and the amount of bubbles was reduced by 75%, as compared with those respectively in A11. The composition has remarkable improvement of various properties and offers unexpected technical effects.

The glass fiber composition according to the present invention can be used for making glass fibers having the aforementioned excellent properties.

The glass fiber composition according to the present invention can be used in combination with one or more organic and/or inorganic materials for preparing composite materials having excellent performances, such as glass fiber reinforced base materials.

Finally, what should be made clear is that, in this text, the terms "contain", "comprise" or any other variants are intended to mean "nonexclusively include" so that any process, method, article or equipment that contains a series of factors shall include not only such factors, but also include other factors that are not explicitly listed, or also include intrinsic factors of such process, method, object or equipment. Without more limitations, factors defined by the phrase "contain a . . . " or its variants do not rule out that there are other same factors in the process, method, article or equipment which include said factors.

The above examples are provided only for the purpose of illustrating instead of limiting the technical solutions of the present invention. Although the present invention is described in details by way of aforementioned examples, one skilled in the art shall understand that modifications can also be made to the technical solutions embodied by all the aforementioned examples or equivalent replacement can be made to some of the technical features. However, such modifications or replacements will not cause the resulting technical solutions to substantially deviate from the spirits and ranges of the technical solutions respectively embodied by all the examples of the present invention.

INDUSTRIAL APPLICABILITY OF THE INVENTION

The glass fiber composition of the present invention can not only have favorable liquidus temperature and less crystallization rate, but also be suitable for tank furnace production, greatly improve the elasticity modulus of glass, and resolve the bottleneck that the modulus of S glass and R glass cannot be improved with the growth of the production scale. The glass fiber composition of the present invention makes a breakthrough in elasticity modulus, crystallization properties and fining performance of the glass compared with the mainstream high-modulus glass, greatly improves the elastic modulus, reduces the crystallization risk of molten glass and bubble amount under the same conditions, and therefore is more suitable for large-scale tank furnace production of high-modulus fiberglass with low bubble amount.

The invention claimed is:

1. A high-modulus glass fiber composition comprising the following components expressed as weight percentage:

| | |
|---|---|
| $SiO_2$ | 55.7-58.9% |
| $Al_2O_3$ | 15-19.9% |
| $Y_2O_3$ | 0.1-4.3% |
| $La_2O_3$ | less than or equal to 1.5% |
| $CeO_2$ | less than or equal to 1.2% |
| CaO | 6-10% |
| MgO | 9.05-9.95% |
| SrO | less than or equal to 2% |
| $Li_2O + Na_2O + K_2O$ | less than or equal to 0.99% |
| $Li_2O$ | less than or equal to 0.65% |
| $Fe_2O_3$ | less than 1% |
| $TiO_2$ | 0.1-1.5% | wherein, the range of the weight percentage ratio $C1=Y_2O_3/(Y_2O_3+La_2O_3+CeO_2)$ is greater than 0.6, the range of total content of $La_2O_3+CeO_2$ expressed as weight percentage is 0.1-2%, the range of weight percentage ratio $C2=SiO_2/CaO$ is 5.8-9.3, and the range of weight percentage ratio $C3=MgO/(CaO+SrO)$ is 0.9-1.6.

2. The high-modulus glass fiber composition of claim 1, wherein the content of $Li_2O$ expressed as weight percentage is 0.05-0.55%.

3. The high-modulus glass fiber composition of claim 1, wherein the content of $Y_2O_3$ expressed as weight percentage is 0.5-3.9%.

4. The high-modulus glass fiber composition of claim 1, wherein the content of $Y_2O_3$ expressed as weight percentage is 1.3-3.9%.

5. The high-modulus glass fiber composition of claim 1, wherein the content of $La_2O_3$ expressed as weight percentage is 0.05-1.2%.

6. The high-modulus glass fiber composition of claim 1, wherein the content of $CeO_2$ expressed as weight percentage is 0.05-1%.

7. The high-modulus glass fiber composition of claim 1, wherein the content of CaO expressed as weight percentage is 8-9.3%.

8. The high-modulus glass fiber composition of claim 1, wherein the total content of $Li_2O+Na_2O+K_2O$ expressed as weight percentage is 0.4-0.94%.

9. The high-modulus glass fiber composition of claim 1, wherein the total content of $Y_2O_3+La_2O_3+CeO_2$ expressed as weight percentage is 1.4-4.2%.

10. The high-modulus glass fiber composition of claim 1 comprising the following components expressed as weight percentage:

| | |
|---|---|
| $SiO_2$ | 55.7-58.9% |
| $Al_2O_3$ | 15-19.9% |
| $Y_2O_3$ | 0.1-4.3% |
| $La_2O_3$ | less than or equal to 1.5% |
| $CeO_2$ | less than or equal to 1.2% |
| CaO | 6-10% |
| MgO | 9.05-9.95% |
| SrO | less than or equal to 2% |
| $Li_2O + Na_2O + K_2O$ | less than or equal to 0.99% |
| $Li_2O$ | less than or equal to 0.65% |
| $Fe_2O_3$ | less than 1% |
| $TiO_2$ | 0.1-1.5% | wherein, the range of the weight percentage ratio $C1=Y_2O_3/(Y_2O_3+La_2O_3+CeO_2)$ is greater than 0.6, the range of the weight percentage ratio $C2=SiO_2/CaO$ is 5.8-9.3, and the range of the weight percentage ratio $C3=MgO/(CaO+SrO)$ is 0.9-1.6.

11. The high-modulus glass fiber composition of claim 1 comprising the following components expressed as weight percentage:

| | |
|---|---|
| $SiO_2$ | 55.7-58.9% |
| $Al_2O_3$ | 15-19.9% |
| $Y_2O_3$ | 0.1-4.3% |
| $La_2O_3$ | 0.05-1.2% |
| $CeO_2$ | 0.05-1% |
| $La_2O_3 + CeO_2$ | 0.1-2% |
| CaO | 6-10% |
| MgO | 9.05-9.95% |
| SrO | less than or equal to 2% |
| $Li_2O + Na_2O + K_2O$ | less than or equal to 0.99% |
| $Li_2O$ | less than or equal to 0.65% |
| $Fe_2O_3$ | less than 1% |
| $TiO_2$ | 0.1-1.5% | wherein, the range of the weight percentage ratio $C1=Y_2O_3/(Y_2O_3+La_2O_3+CeO_2)$ is greater than 0.7, the range of the weight percentage ratio $C2=SiO_2/CaO$ is 6.3-8.5, and the range of the weight percentage ratio $C3=MgO/(CaO+SrO)$ is 1-1.5.

12. The high-modulus glass fiber composition of claim 1 comprising the following components expressed as weight percentage:

| | |
|---|---|
| $SiO_2$ | 55.7-58.9% |
| $Al_2O_3$ | 15-19.9% |
| $Y_2O_3$ | 0.5-3.9% |
| $La_2O_3$ | 0.05-1.2% |
| $CeO_2$ | 0.05-1% |
| $La_2O_3 + CeO_2$ | 0.1-2% |
| CaO | 6-10% |
| MgO | 9.05-9.95% |
| SrO | less than or equal to 2% |
| $Li_2O + Na_2O + K_2O$ | less than or equal to 0.99% |
| $Li_2O$ | less than or equal to 0.65% |
| $Fe_2O_3$ | less than 1% |
| $TiO_2$ | 0.1-1% | wherein, the range of the weight percentage ratio $C1=Y_2O_3/(Y_2O_3+La_2O_3+CeO_2)$ is 0.75-0.97, the range of the weight percentage ratio $C2=SiO_2/CaO$ is 6.3-8.5, and the range of the weight percentage ratio $C3=MgO/(CaO+SrO)$ is 1-1.5.

13. The high-modulus glass fiber composition of claim 1, wherein the range of the weight percentage ratio $C1=Y_2O_3/(Y_2O_3+La_2O_3+CeO_2)$ is 0.75-0.97.

14. The high-modulus glass fiber composition of claim 1, wherein the range of the weight percentage ratio $C4=La_2O_3/CeO_2$ is greater than 1.

15. A glass fiber being produced from the glass fiber composition described in claim 1.

16. A composite material incorporating the glass fiber described in claim 15.

* * * * *